United States Patent
Issler

(10) Patent No.: US 6,877,253 B2
(45) Date of Patent: Apr. 12, 2005

(54) METHOD AND APPARATUS FOR PROVIDING A SHOE USING SAN CRISPINO AND VULCANIZATION CONSTRUCTIONS

(75) Inventor: David Issler, North Andover, MA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 10/384,297

(22) Filed: Mar. 7, 2003

(65) Prior Publication Data

US 2004/0172849 A1 Sep. 9, 2004

(51) Int. Cl.[7] ............................................. A43B 13/28
(52) U.S. Cl. ................ 36/12; 36/14; 36/16; 12/142 RS
(58) Field of Search ............................... 36/12, 14, 16; 12/142 RS, 142 T

(56) References Cited

U.S. PATENT DOCUMENTS

| | | | | | |
|---|---|---|---|---|---|
| 1,348,136 A | * | 7/1920 | Dunbar | ........................... | 36/14 |
| 2,032,655 A | * | 3/1936 | Finberg et al. | ........... | 12/142 C |
| 2,499,751 A | * | 3/1950 | Hoza | ........................... | 36/9 R |
| 2,500,937 A | * | 3/1950 | Earl | ............................... | 36/14 |
| 2,521,464 A | * | 9/1950 | Lathan | ........................... | 36/16 |
| 2,574,582 A | * | 11/1951 | Rollman | ........................ | 36/14 |
| 2,620,574 A | * | 12/1952 | Pepperman, Jr. | ............. | 36/172 |
| 2,641,067 A | * | 6/1953 | Nappi | ........................... | 36/16 |
| 2,651,118 A | * | 9/1953 | Root | ............................. | 36/14 |
| 2,669,953 A | * | 2/1954 | Slinkard | ...................... | 112/52 |
| 2,958,965 A | * | 11/1960 | Scala | ............................. | 36/16 |
| 3,217,345 A | * | 11/1965 | Suitzer | ..................... | 12/142 R |

* cited by examiner

Primary Examiner—M. D. Patterson
(74) Attorney, Agent, or Firm—St. Onge Steward Johnston & Reens LLC

(57) ABSTRACT

The invention relates to a method and apparatus for providing a shoe having an upper with a first surface and a foot placement mechanism for placing a foot and having a top surface and a bottom surface. The foot placement mechanism also includes an extension extending outwardly from the foot placement mechanism in a direction generally parallel to the top surface. The first surface of the upper is in contact with the top surface in a localized area proximate to the extension. A securing mechanism is used to secure the upper to the foot placement mechanism in the area proximate to where the first surface contacts the top surface. A sole is then secured to the bottom surface. Preferably, vulcanized rubber is in contact with the sole and bottom surface for securing the sole to the bottom surface by vulcanization.

5 Claims, 5 Drawing Sheets

METHOD AND APPARATUS FOR PROVIDING A SHOE USING SAN CRISPINO AND VULCANIZATION CONSTRUCTIONS

FIELD OF THE INVENTION

The invention relates to a shoe having an improved shoe construction that has enhanced cushioning and strength without sacrificing aesthetic appearance.

BACKGROUND OF THE INVENTION

A variety of different sole constructions are used by the footwear industry. For the most part, each sole construction has characteristics that make it particularly well-suited for specific applications. For example, some sole constructions are selected for their durability, others for their flexibility and comfort, while still others are selected for their aesthetic appeal.

One type of shoe construction is referred to as the San Crispino construction. FIGS. 1a and 1b represent a San Crispino shoe construction in accordance with the prior art and having upper 12, socklining 14, and an inwardly turned end 16 of upper 12 fastened to a bottom surface 18 of socklining 14. Typically, thread 20 is used to fasten upper 12 to socklining 14.

Generally, a shoe made in accordance with the San Crispino construction is believed to be an aesthetically appealing shoe. However, because upper 12 is fastened to bottom surface 18, a user may feel a lumpy, uneven fit when wearing the shoe. Moreover, because thread 20 is usually used to secure upper 12 and wrapper 24 to socklining 14, the overall thickness of upper 12 and/or wrapper 24 and socklining 14 is generally limited to the ability of a machine or person to be able to pass thread 20 through these components. More often than not, the overall thickness of a shoe made in accordance with the San Crispino construction is relatively thin when compared with other shoes, particularly thick soled shoes such as sneakers. Therefore, a San Crispino constructed shoe may not provide the cushioning that sneakers provide. Further, merely cementing a sole to the bottom of a San Crispino constructed upper portion may lack sufficient strength to hold the shoe components together, especially given the weight of a thick sole.

U.S. Pat. No. 5,664,343 to Byrne ("Byrne") appears to disclose a shoe having a San Crispino constructed upper cemented to a sole. However, Byrne does not seem to address a shoe that overcomes the lumpy, uneven fit typically found among San Crispino constructed shoes. Byrne also does not appear to provide a shoe having sufficient strength.

Another type of sole construction is referred to as vulcanization, which typically involves applying vulcanizing rubber, a form of adhesive, to the shoe components and subjecting the components of a shoe to high temperatures, where the vulcanizing rubber and components would thereafter adhere to one another as a single unit. Heavy duty materials, such as rubber, are often used for the shoe components because they have a better capability to withstand high temperatures as opposed to other materials commonly found on shoes, such as leather.

A possible disadvantage of vulcanization is that the weight of the shoe is considerable, when compared to other shoes of other constructions, because of the generally heavy materials and amount of vulcanizing rubber used. Another possible disadvantage of vulcanization is the resulting crude appearance of the finished shoe, which may also be due to the use of heavy, bulky materials.

What is desired, therefore, is a constructed shoe that improves upon the lumpy and uneven fit commonly found with some types of shoes. What is also desired is a thicker sole for enhancing cushioning and comfort. Another desire is a shoe that is adequately secured to the thick sole. A further desire is to provide a shoe that overcomes the disadvantages described above while also having an improved aesthetic appearance.

SUMMARY OF THE INVENTION

Accordingly, it is an object of the invention to provide a shoe that is comfortable.

Another object is to provide a shoe with a thicker sole to enhance comfort and appearance.

A further object is to provide a shoe with a sole that is adequately secured to the upper portion of the shoe.

Still a further object is to provide a shoe that combines aesthetic appeal with comfort, strength, and durability.

These and other objects of the invention are achieved by provision of a shoe having an upper with a first surface and a foot placement mechanism for placing a foot and having a top surface and a bottom surface. The foot placement mechanism also includes an extension extending outwardly from the foot placement mechanism in a direction generally parallel to the top surface. The first surface of the upper is in contact with the top surface in a localized area proximate to the extension. A securing mechanism is used to secure the upper to the foot placement mechanism in the area proximate to where the first surface contacts the top surface. A sole is then secured to the bottom surface. Preferably, vulcanized rubber is in contact with the sole and bottom surface for securing the sole to the bottom surface by vulcanization.

In some embodiments, a filler is placed between the sole and bottom surface for enhancing cushioning to the shoe. In these embodiments, vulcanized rubber is in contact with the filler, sole, and bottom surface.

Optionally, and for enhancing aesthetic appeal, a wrapper may be used to cover the area where the upper is secured to the foot placement mechanism. The wrapper contacts the top surface of the foot placement mechanism and extends around the extension and underneath to the bottom surface.

In another aspect of the invention, a method is provided, including the steps of providing an upper having a first surface, providing a foot placement mechanism having a top surface and a bottom surface, and extending the foot placement mechanism in a direction generally parallel to the top surface, thereby defining an extension. The method further includes contacting the first surface with the top surface in a localized area proximate to the extension and securing the upper to the foot placement mechanism in an area proximate to where the first surface contacts the top surface. The method further attaches a sole to the bottom surface and places vulcanizing rubber between the bottom surface and the sole. The method also includes heating the vulcanizing rubber, sole, and bottom surface to adhere the sole and bottom surface together.

The method for constructing the shoe may also include the step of vulcanizing the sole, vulcanizing rubber, and bottom surface together.

Optionally, the method for constructing the shoe includes the step of placing a filler between the sole and the bottom surface and vulcanizing the filler, the sole, the vulcanizing rubber, and the bottom surface.

The invention and its particular features and advantages will become more apparent from the following detailed description considered with reference to the accompanying drawings.

DETAILED DESCRIPTION OF THE DRAWINGS

Figure 2:
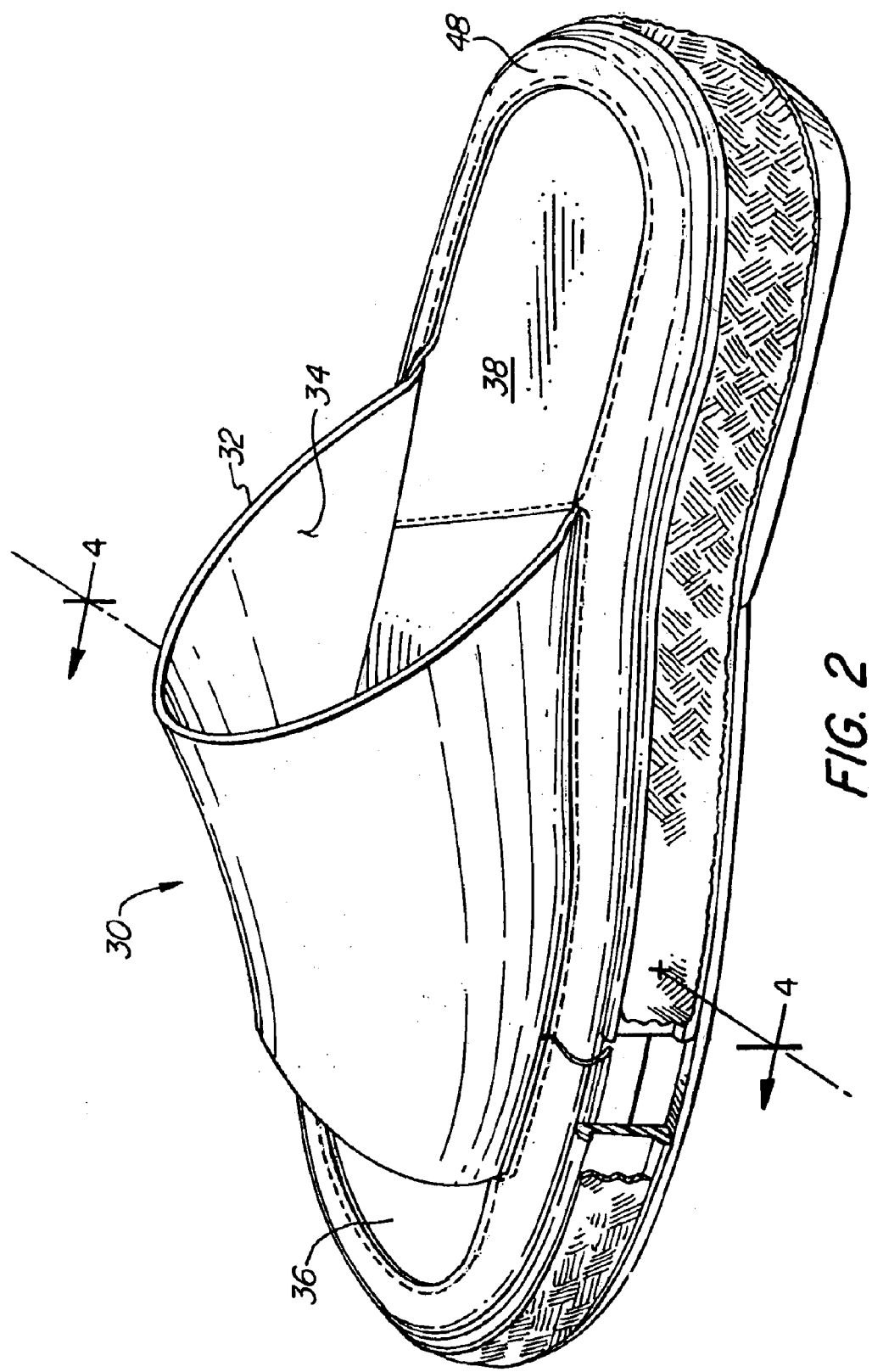
FIG. 2 depicts a shoe in accordance with the invention.

FIG. 2 depicts shoe 30 in accordance with the invention. Shoe 30 includes upper 32 having first surface 34 and foot placement mechanism 36 having top surface 38 and bottom surface 40. Foot placement mechanism 36 is any device where a user's foot may rest, including a footbed, socklining, insole, vamp, or insert.

Figure 1:
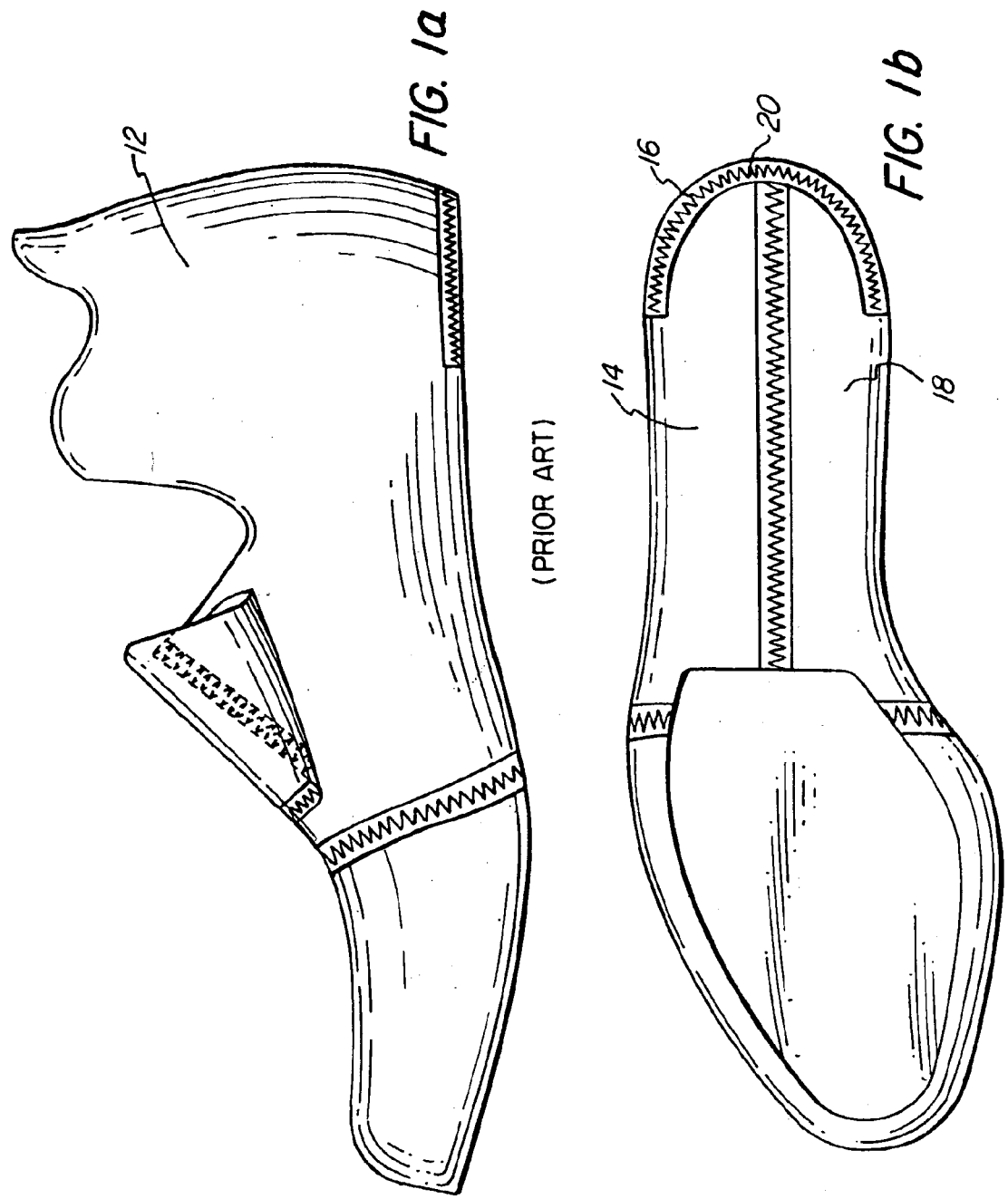
FIGS. 1a and 1b depict a shoe having a San Crispino construction known in the art.
Figures 5, 6:
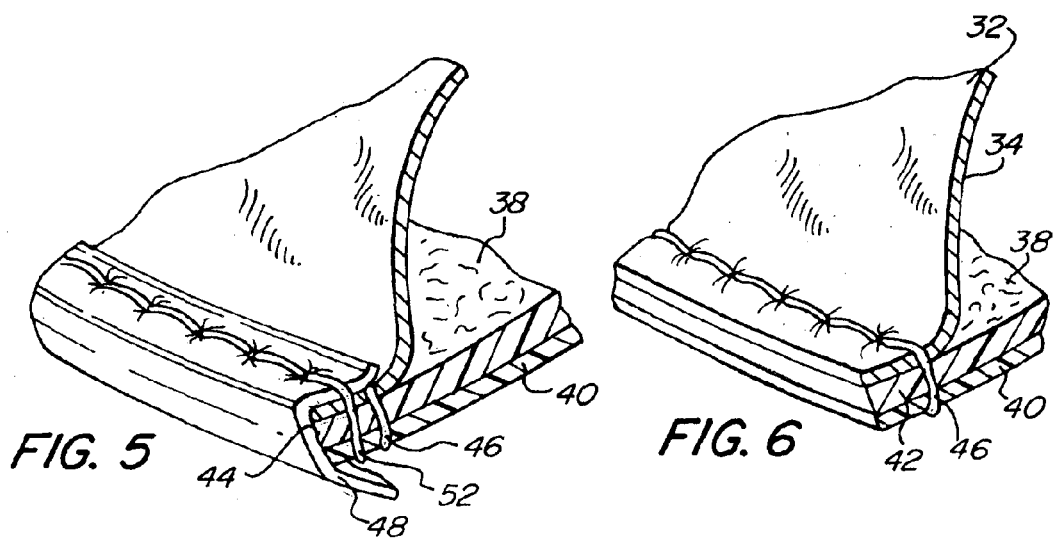
FIG. 5 depicts an exploded view of the upper, socklining, and wrapper in the area where the upper contacts the socklining.
FIG. 6 depicts an exploded view of the upper and socklining.

As shown in FIGS. 1, 5, and 6, foot placement mechanism 36 further includes extension 42 extending from foot placement mechanism 36 in a direction generally parallel, or in a horizontal direction, to top surface 38. Extension 42 may be more particularly defined as being a peripheral edge of foot placement mechanism 36 extending outwardly from approximately the area where first surface 34 of upper 32 contacts top surface 38 to edge 44. As shown in FIG. 2, upper 32 does not extend over the entire top surface 38. In other embodiments, upper 32 may extend over the entire top surface 38, in which case first surface 34 contacts top surface 38 around an entire periphery of foot placement mechanism 36.

To secure first surface 34 to top surface 38, securing mechanism 46 is used to sew upper 32 to foot placement mechanism 36 proximate to where first surface 34 contacts top surface 38. Securing mechanism 46 is any thread or flexible material, such as fishing line, nylon, or better, to sew upper 32 to foot placement mechanism 36. In a preferred embodiment, securing mechanism 46 is thread, yarn, wire, or any flexible material that may be used to sew upper 32 to foot placement mechanism 36. In other embodiments, securing mechanism 46 is an adhesive or fastener.

Optionally, to enhance aesthetic appearance and as shown in FIGS. 1 and 5, wrapper 48 may be used to cover the area where securing mechanism 46 sews upper 32 to foot placement mechanism 36. Wrapper 48 is any material that extends from top surface 38, around edge 44, and to bottom surface 40 of foot placement mechanism 36. Wrapper 48 may further extend around a periphery of foot placement mechanism 36 in at least one localized area of the periphery.

A second securing mechanism 52, which includes all of the limitations of securing mechanism 46, may be used to sew wrapper 48 to extension 42 by passing through, as shown in FIG. 5, wrapper 48 as it is in contact with top surface 38, extension 42, and wrapper 48 as it is in contact with bottom surface 40.

Sole 54, which may be either a midsole or outsole, is attached to bottom surface 40 by vulcanization, including placing vulcanized rubber 56 between sole 54 and bottom surface 40. In addition to bottom surface 40, sole 54 also contacts wrapper 48.

Figure 4:
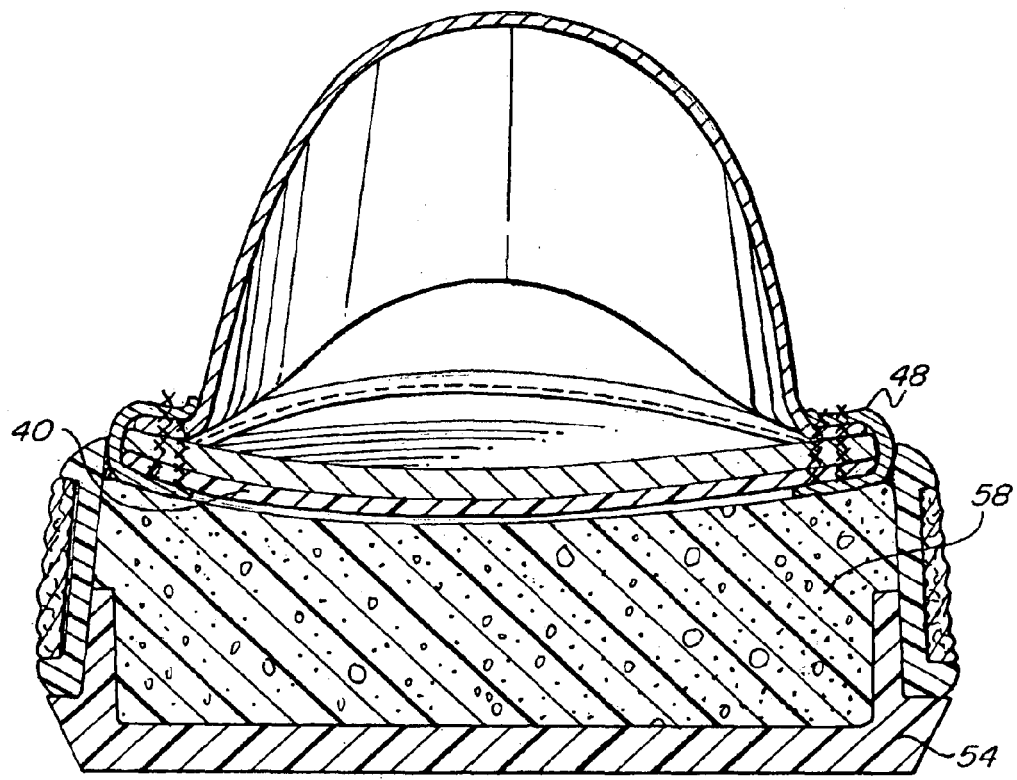
FIG. 4 depicts a cross sectional view of the shoe shown in FIG. 1.

Optionally, as shown in FIG. 4 and to enhance comfort or to provide an appearance of a thicker sole, a filler 58 may be placed between bottom surface 40 and sole 54. Filler 58 is any device that fills a void or space, such as a spacer. Filler 58 may, but need not, be made of a cushioning material such as foam, rubber, or plastic.

Figure 3:
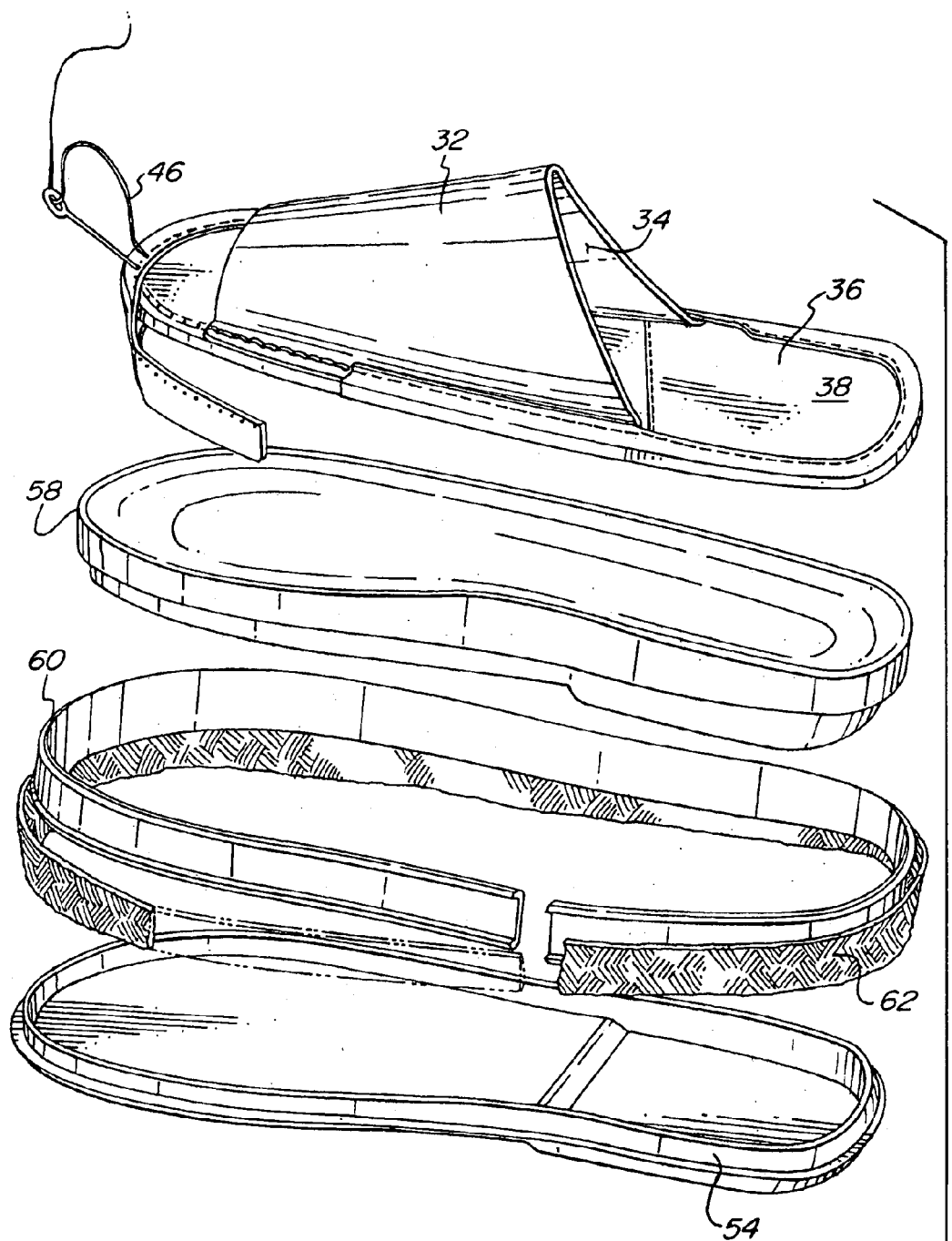
FIG. 3 depicts various components of the shoe shown in FIG. 2.

As shown in FIGS. 3 and 4, side wall 60 is attached to filler 58, sole 54, and/or wrapper 48 to connect these components together and to provide support to shoe 30 by helping to maintain the positions of filler 58 relative to sole 54 and foot placement mechanism 36. Side wall 60 is in at least one localized area of a periphery of shoe 30. To enhance appearance of shoe 30, side wall 60 may also have decorative ornaments 62 or other designs thereon. It is understood that side wall 60 may also be used with shoes not having filler 58, in which case side wall 60 is attached to sole 54 and/or wrapper 48. Side wall 60 is subjected to the same attachment techniques as sole 54, including vulcanization. Shoe 30 should not be limited to a particular feature of ornament 62 as multiple designs may be used to alter the appearance of side wall 64.

Vulcanizing rubber is any glue or adhesive suitable for vulcanization. Vulcanizing rubber should further have adequate strength for securing the components of shoe 30 together, whether it be securing sole 54 to bottom surface 40, for securing sole 54, filler 58, and bottom surface 40 together, or securing side wall 60 to all of the above components.

Figure 7:
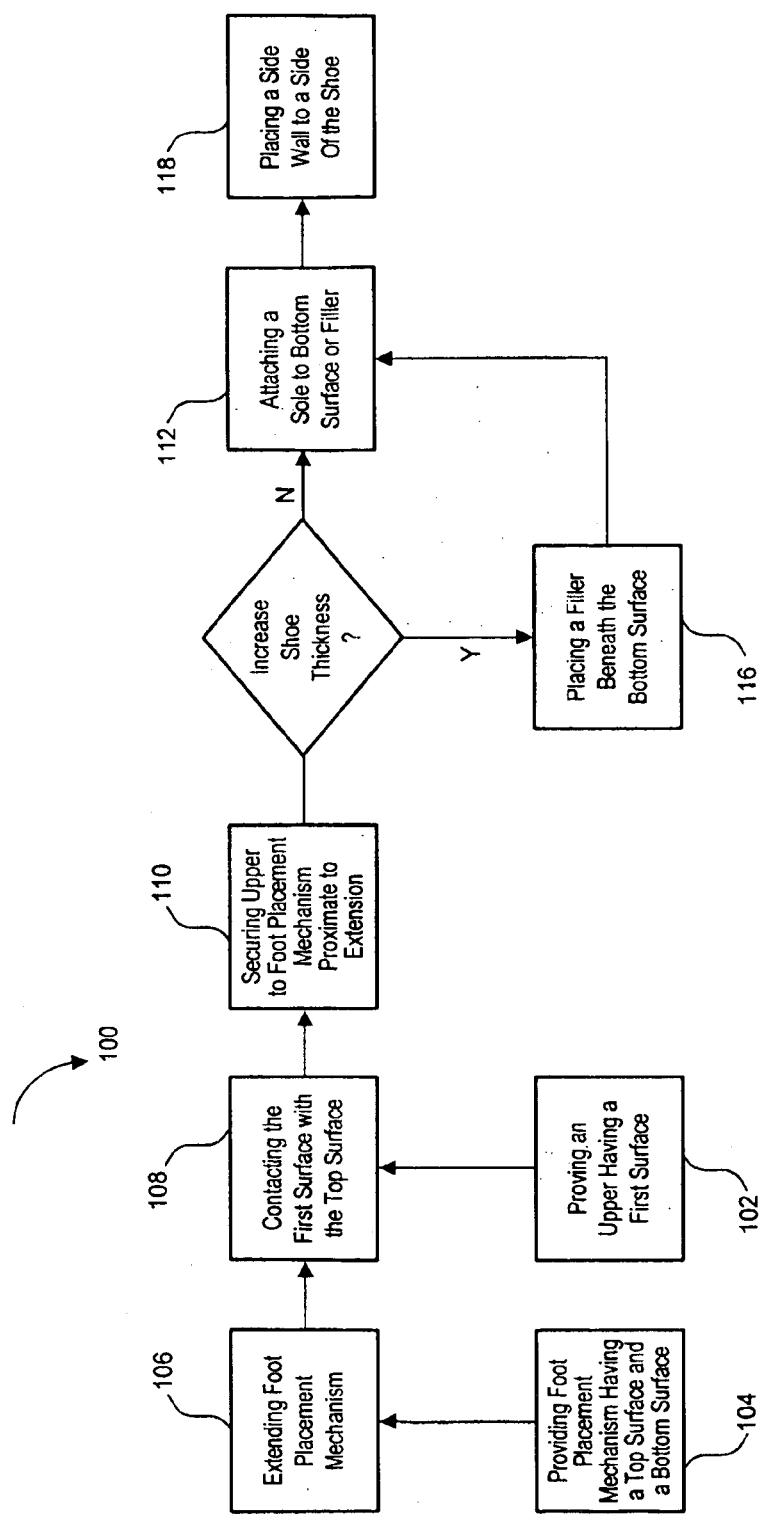
FIG. 7 depicts a method for providing the shoe shown in FIG. 2.

FIG. 7 depicts method 100 for providing shoe 30 shown in FIG. 3. Method 100 includes the steps of providing 102 an upper having a first surface and providing 104 a foot placement mechanism having a top surface and a bottom surface. Method 100 further extends 106 the foot placement mechanism in a direction generally parallel to the top surface, thereby defining an extension.

Method 100 further includes contacting 108 the first surface with the top surface in a localized area proximate to the extension. Method 100 further includes securing 110 the upper to the foot placement mechanism in an area proximate to where the first surface contacts the top surface. Method 100 may secure 110 the upper to the foot placement mechanism using a thread or other flexible sewing material.

Method 100 further includes attaching 112 a sole to the bottom surface. Preferably, attaching 112 the sole to the bottom surface is done by vulcanization, which entails placing vulcanizing rubber between the sole and the bottom surface and heating the sole, bottom surface, and vulcanizing rubber to a temperature known in the art for vulcanizing shoes.

Method 100 may optionally include, for enhancing comfort or appearance, placing 116 a filler between the sole and bottom surface. In a preferred embodiment, the filler, sole, and bottom surface are attached to one another by vulcanization, where vulcanizing rubber is placed between these components.

An additional optional feature of method 100 includes the step of placing 118 a side wall to a side of the filler, sole, and foot placement mechanism to help maintain the position of the filler relative to the other components. For embodiments without a filler, the side wall may be placed 118 on a side of the sole and foot placement mechanism. In addition to providing support to the shoe, the side wall may also enhance the appearance of the shoe by including decorative designs or ornaments thereon. Side wall is placed 118 around at least one localized area of a periphery of shoe 30 and includes the same attachment techniques as method attaches 112 sole, including vulcanization.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A shoe, comprising:

an upper having a first surface;

a foot placement mechanism for placing a foot and having a top surface and a bottom surface;

said foot placement mechanism having an extension extending from said foot placement mechanism in a direction generally parallel to said top surface;

said first surface being in contact with said top surface in a localized area proximate to said extension;

a securing mechanism for securing said upper to said foot placement mechanism in an area proximate to where said first surface contacts said top surface;

a sole;

a filler between said sole and said bottom surface for enhancing cushioning to the shoe, said filler being of a different material than said sole;

a wrapper in contact with said top surface and extending around said extension to contact said bottom surface for covering a part of said extension, a side wall in contact with said wrapper and said sole for holding components of the shoe together, vulcanized rubber in contact with said sole said wrapper, and said side wall; and wherein said wrapper bottom surface, said sole, said side wall, and said vulcanized rubber undergo vulcanization for securing said sole to said foot placement mechanism.

2. The shoe according to claim 1, said vulcanized rubber being in contact with said filler, said sole, and said bottom surface.

3. A method for constructing a shoe, comprising the steps of:

providing an upper having a first surface;

providing a foot placement mechanism having a top surface and a bottom surface;

extending the foot placement mechanism in a direction generally parallel to the top surface, thereby defining an extension;

contacting the first surface with the top surface in a localized area proximate to the extension;

securing the upper to the foot placement mechanism in an area proximate to where the first surface contacts the top surface;

placing a sole below to the bottom surface;

placing a filler between the sole and the bottom surface;

contacting a wrapper with the top surface and extending the wrapper around the extension to contact the bottom surface for covering a part of the extension;

contacting a side wall with the wrapper and sole for holding componts of the shoe together;

placing vulcanizing rubber between the bottom surface and the sole, wrapper, and side wall; and heating the vulcanizing rubber, sole, wrapper, and side wall to adhere the soles wrapper, and side wall together.

4. The method for constructing the shoe according to claim 3, further comprising the step of vulcanizing the sole, vulcanizing rubber, and bottom surface.

5. The method for constructing the shoe according to claim 3, further comprising the step of vulcanizing the filler, the sole, the vulcanizing rubber, and the bottom surface.

* * * * *